US006108656A

United States Patent [19]
Durst et al.

[11] Patent Number: 6,108,656
[45] Date of Patent: *Aug. 22, 2000

[54] AUTOMATIC ACCESS OF ELECTRONIC INFORMATION THROUGH MACHINE-READABLE CODES ON PRINTED DOCUMENTS

[75] Inventors: Robert T. Durst; Kevin Hunter, both of Fort Myers, Fla.

[73] Assignee: NeoMedia Technologies, Inc., Fort Myers, Fla.

[*] Notice: This patent is subject to a terminal disclaimer.

[21] Appl. No.: 09/309,869

[22] Filed: May 11, 1999

Related U.S. Application Data

[63] Continuation of application No. 08/967,383, Nov. 8, 1997, Pat. No. 5,933,829.
[60] Provisional application No. 60/030,166, Nov. 8, 1996.
[51] Int. Cl.[7] .................................................. G06F 17/30
[52] U.S. Cl. ............................... 707/10; 707/3; 707/9
[58] Field of Search ........................... 235/462; 380/25; 395/200.3, 766; 707/10, 514, 9, 3; 705/26, 3; 463/41

[56] References Cited

U.S. PATENT DOCUMENTS

| | | |
|---|---|---|
| 5,304,786 | 4/1994 | Pavlidis et al. .......................... 235/462 |
| 5,649,186 | 7/1997 | Ferguson .................................... 707/10 |
| 5,671,282 | 9/1997 | Wolff et al. ................................. 380/25 |
| 5,682,540 | 10/1997 | Klotz, Jr. et al. ........................ 395/766 |
| 5,710,887 | 1/1998 | Chelliah et al. ........................... 705/26 |
| 5,745,681 | 4/1998 | Levine et al. ......................... 395/200.3 |
| 5,757,917 | 5/1998 | Rose et al. ................................. 380/25 |
| 5,765,176 | 6/1998 | Bloomberg .............................. 707/514 |
| 5,778,367 | 7/1998 | Wesinger, Jr. et al. .................... 707/10 |
| 5,791,991 | 8/1998 | Small ........................................ 463/41 |
| 5,848,413 | 12/1998 | Wolff ........................................ 707/10 |
| 5,933,829 | 8/1999 | Durst et al. ............................... 707/10 |

FOREIGN PATENT DOCUMENTS

| | | |
|---|---|---|
| WO 98/24036 | 6/1998 | WIPO . |
| WO 98/24050 | 6/1998 | WIPO . |
| WO 98/40823 | 9/1998 | WIPO . |
| WO 98/49813 | 11/1998 | WIPO . |

*Primary Examiner*—Wayne Amsbury
*Assistant Examiner*—Thuy Pardo
*Attorney, Agent, or Firm*—Greenberg Traurig, LLP; Anthony R. Barkume

[57] ABSTRACT

The present invention is a system and method for providing automated access to electronic information stored in a database in either a local or remote location. The system utilizes a machine-readable code printed on a document, referred to herein as an intelligent document since it stores information used to automatically access the information. The machine-readable symbol comprises encoded source data, wherein the source data comprises application launch information as well as file location information. The source data is encoded and printed, and then distributed by the vendor by any logical means to the end user. The end user then scans the code via appropriate code scanning (e.g. bar code scanning) equipment, decodes the raw decoded data, and the file location information is then used to access the appropriate file. In a preferred embodiment, a Web browser program is launched, and the URL of the vendor's Web site is accessed through the Internet. Local file retrieval may also be implemented on the client computer itself, as well as over an intranet or LAN environment. Additional user-specific demographic data such as the user's name and address may also be encoded in the machine-readable code when the document is specifically tailored for individual targeting, such as mailing labels. This demographic information is uploaded to the WWW site for use by the vendor. In addition, the present invention encodes security data, such as an encryption key, for use in secure data transmissions such as electronic commerce over the Internet.

31 Claims, 10 Drawing Sheets

AUTOMATIC ACCESS OF ELECTRONIC INFORMATION THROUGH MACHINE-READABLE CODES ON PRINTED DOCUMENTS

CROSS-REFERENCE TO RELATED APPLICATION

This application is a continuation application of application Ser. No. 08/967,383, which was filed on Nov. 8, 1997 now U.S. Pat. No. 5,933,829, which was on and claimed the priority of then co-pending provisional patent application filed in the United States Patent and Trademark Office on Nov. 8, 1996 and assigned Serial No. 60/030,166.

BACKGROUND OF THE INVENTION

Electronic data sources, such as conventional databases, the Internet (i.e., the World Wide Web("WWW")) are a rich and important means of information retrieval and distribution and, increasingly, electronic commerce. However, there are problems finding the information desired in this increasingly complex and changing network of data sources. Recently introduced Internet "search engines", such as YAHOO, help by allowing a user to search on-line indices of information sources, and even full source text, for relevant key words and phrases related to their topic of interest, but even carefully structured queries by experienced users often results in hundreds and even thousands of possible "hits" which are not sufficiently specific to preclude further manual search which is both data resource inefficient and time consuming.

Because of these inefficiencies, as well as general lack of familiarity with search engines and their syntax, users often rely on human readable print and broadcast media advertising to identify source addresses (e.g., Uniform Resource Locators ("URLs")) for Web sites and other online information of interest. Print media is particularly effective since: (1) it is the most ubiquitous method of communication and advertising in the modern world; and (2) a printed document can serve as a persistent reference to be saved and used during a subsequent on-line session.

However, human readable printed source addresses, and especially URL's, are particularly difficult to manually enter in software programs, such as web browsers, due to their length and use of complex and unfamiliar symbols. If the characters in a URL are not entered exactly, retrieval is prevented or, in a limited number of cases, a legal but incorrect source is accessed. This is especially true when URLs incorporate foreign languages and/or complex query instructions to on-line databases, as is increasingly frequent in most Web sites. In addition, the inability to type or otherwise manually enter symbolic address information due to either disability or lack of training complicates use of on-line information resources such as the Internet for millions of individuals.

Finally, it is widely anticipated that Internet access will increasingly be provided through interactive cable television via Web-ready television receivers and set-top boxes used in conjunction with conventional television receivers. In this home entertainment environment, it is difficult to use keyboards for address entry due to both lack of typing skill and the cumbersome placement of these components. Another method which would eliminate typing and allow users to directly link printed addresses and query scripts to electronic information sources would be highly desirable.

Companies that host Web sites for the purpose of providing information such as advertising, often want to know the identity and other related information of the users who visit their sites (i.e., download files therefrom). It would be quite advantageous to provide such companies or vendors with this information as part of a specific file transfer request, e.g., as part of a CGI parameters string included in a URL. Additionally, it would be desirable to be able to effect a secure manner of transferring this information, so that a user would have confidence in the system and thus send sensitive information such as a credit card number or the like with the file transfer request. This would enable electronic commerce to flourish well beyond the point it exists today.

SUMMARY OF THE INVENTION

The present invention is a system and method for providing automated access to electronic information stored in a database in either a local or remote location. The system utilizes a machine-readable code printed on a document, referred to herein as an intelligent document since it stores information used to automatically access the information. The machine-readable symbol comprises encoded source data, wherein the source data comprises application launch information as well as file location information. The source data is encoded and printed, and then distributed by the vendor by any logical means to the end user. The end user then scans the code via appropriate code scanning (e.g. bar code scanning) equipment, decodes the raw decoded data, and the file location information is then used to access the appropriate file. In a preferred embodiment, a Web browser program is launched, and the URL of the vendor's Web site is accessed through the Internet. Local file retrieval may also be implemented on the client computer itself, as well as over an intranet or LAN environment. Additional user-specific demographic data such as the user's name and address may also be encoded in the machine-readable code when the document is specifically tailored for individual targeting, such as mailing labels. This demographic information is uploaded to the WWW site for use by the vendor. In addition, the present invention encodes security data, such as an encryption key, for use in secure data transmissions such as electronic commerce over the Internet.

In particular, the present invention is a method and system for a computer, such as a client computer in a networked computer system, to retrieve a computer file in which a symbol data string comprising a file location pointer is encoded into a machine readable symbol such as a two-dimensional bar code symbol, and the machine readable symbol is rendered within a data carrier (e.g. printed on an intelligent document). A computer input device such as a two-dimensional bar code scanner is coupled to the client computer and transposes an input data string from the machine readable symbol. The computer parses the input data string to determine the file location pointer, and the file location pointer is then utilized pointer to request the computer file designated thereby.

The file location pointer may be utilized to request the computer file by either passing it to an application program on the client computer suitable for processing the corresponding computer file, and then the application program retrieving the computer file from the specified file location. Alternatively, the file location pointer may be utilized to request the computer file by retrieving a copy of the computer file from the specified file location, and then invoking an application program on the client computer suitable for processing the corresponding computer file.

The client computer assembles a computer file transfer request word including the file location pointer and transmits the request word to a target server computer over a computer network system, which may be a wide area network such as the Internet or a local area network (LAN) or intranet. The file location pointer may alternatively specify the location of a computer file stored in a local memory resident in the client computer rather than on a target server computer. When the computer file to be retrieved is on a target server computer on a network, then the file location pointer is a network address associated with the target server computer and a file identifier correlated to the computer file requested by said client computer. In particular, when utilizing the Internet, the file location pointer may be in the form of a uniform resource locator (URL). In any type of networked environment, the target server computer receives the computer file transfer request word and transmits a computer file to the client computer in response thereto.

In addition to the file location pointer, the present invention takes advantage of the information density of the two-dimensional symbology by encoding a source identifier data string within the machine readable symbol. The source identifier data string is used to denote the particular source of the data carrier such as a particular magazine or ad, or can be used to denote an expected user or targeted group of users of the data carrier. The source identifier string is then transposed by the client computer, assembled within the computer file transfer request word, and transmitted to the target server computer. The target server computer stores the source identifier data string received from the client computer in the computer file transfer request word.

Additionally, the machine readable symbol also has encoded therein an encryption key associated with the source identifier data string, which is also transposed by the computer input device. The encryption key is used by the client computer to encrypt information specific to a user of the client computer, and the encrypted user information is assembled within the computer file transfer request word and transmitted to the target server computer. The information specific to a user may be obtained, prior to encryption, from a user information data file stored on the client computer, or it may be obtained from user demographics data correlated to a targeted user of the data carrier that had been previously encoded within and transposed from the machine readable symbol.

The target server computer may then utilize the source identifier data string received as part of the file transfer request word to access a lookup table to determine a decryption key, and then decrypt the encrypted user information received from the client computer in the file transfer request word. The lookup table may either be stored locally on the target server computer, or it may be stored remotely on a secondary server computer.

The decrypted user information may comprise sensitive user information such as a credit card number associated with the user of said client computer, thus enabling on online electronic commercial transaction by utilizing the credit card number. The user demographics data may be used by the target server computer to determine the file to transmit to the client computer; i.e. certain files may be targeted to specific users of the system.

The machine-readable symbol may also have encoded therein an executable command to launch a software utility resident on the client computer, and the software utility is then automatically launched after the machine readable symbol is transposed. For example, the software utility may be an Internet browser program or a word processing program. In addition, specific functions may also be encoded in the machine readable symbol along with the application launch command, such as a command to execute a print job of the retrieved computer file.

The symbol data string may optionally be obfuscated prior to being encoded into the machine readable symbol, in which case the input string transposed must likewise be de-obfuscated by the client computer. The obfuscation may be by computing a checksum of the symbol data string, encrypting the symbol data string by utilizing the checksum as an encryption key, and assembling the checksum with the encrypted symbol data string prior to encoding into the machine readable symbol. The de-obfuscation would then be accomplished by parsing the input data string to determine the checksum, decrypting the encrypted symbol data string with the checksum as a decryption key, computing a checksum of the decrypted symbol data string, and comparing the computed checksum with the checksum from said input data string. A valid data condition would be indicated when the comparison step is successful; and an invalid data condition would be indicated when the comparison step is unsuccessful.

DETAILED DESCRIPTION OF THE PREFERRED EMBODIMENT

Figure 1:
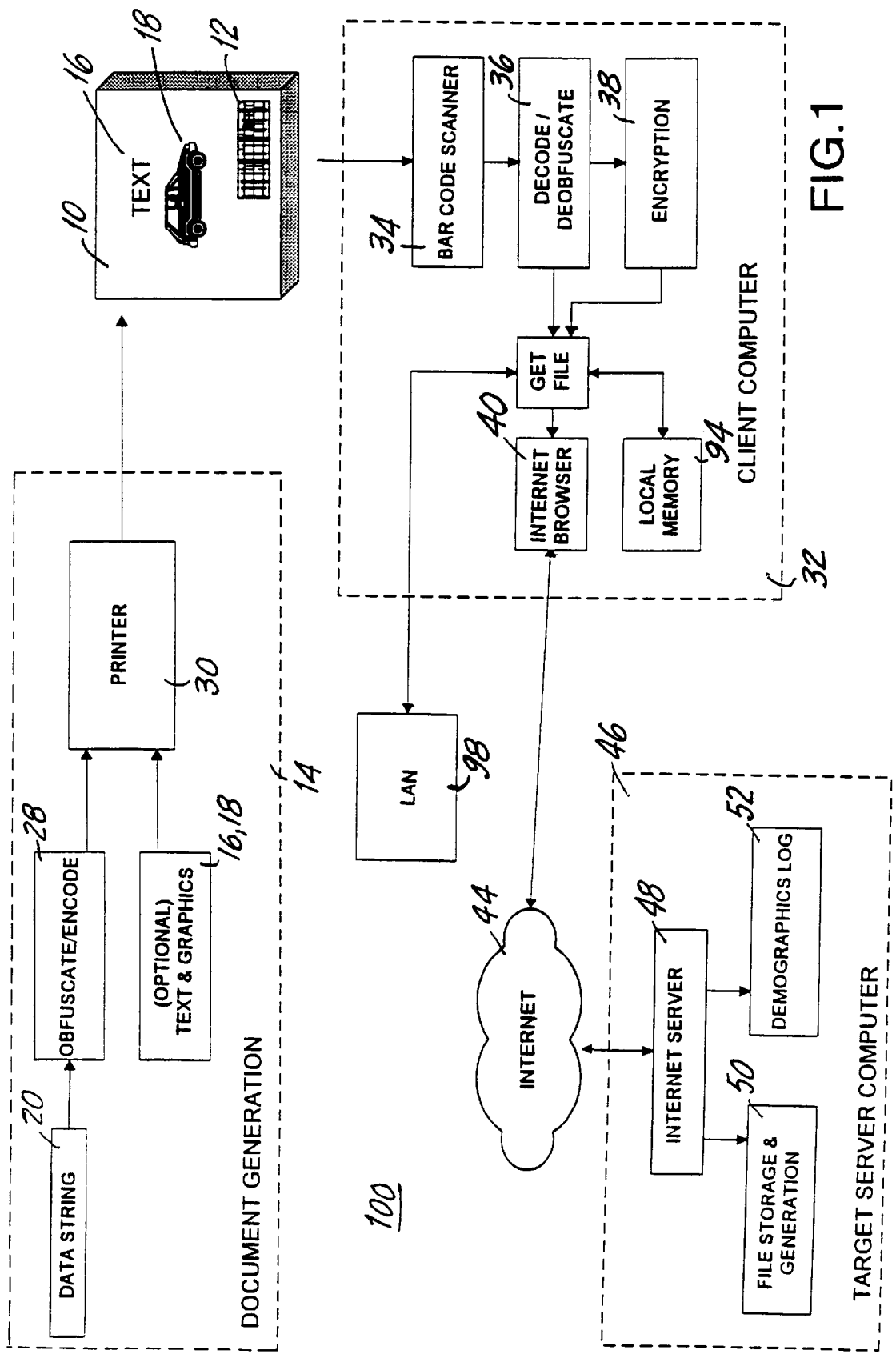
FIG. 1 is a diagram of the system of the present invention.

The system 100 of the present invention for generating and reading an intelligent document 100 is illustrated in block diagram form in FIG. 1. The system 10 comprises an intelligent document generation system 14, which encodes, assembles and prints an intelligent document 10 for subsequent scanning at a client computer 32.

Figure 6:
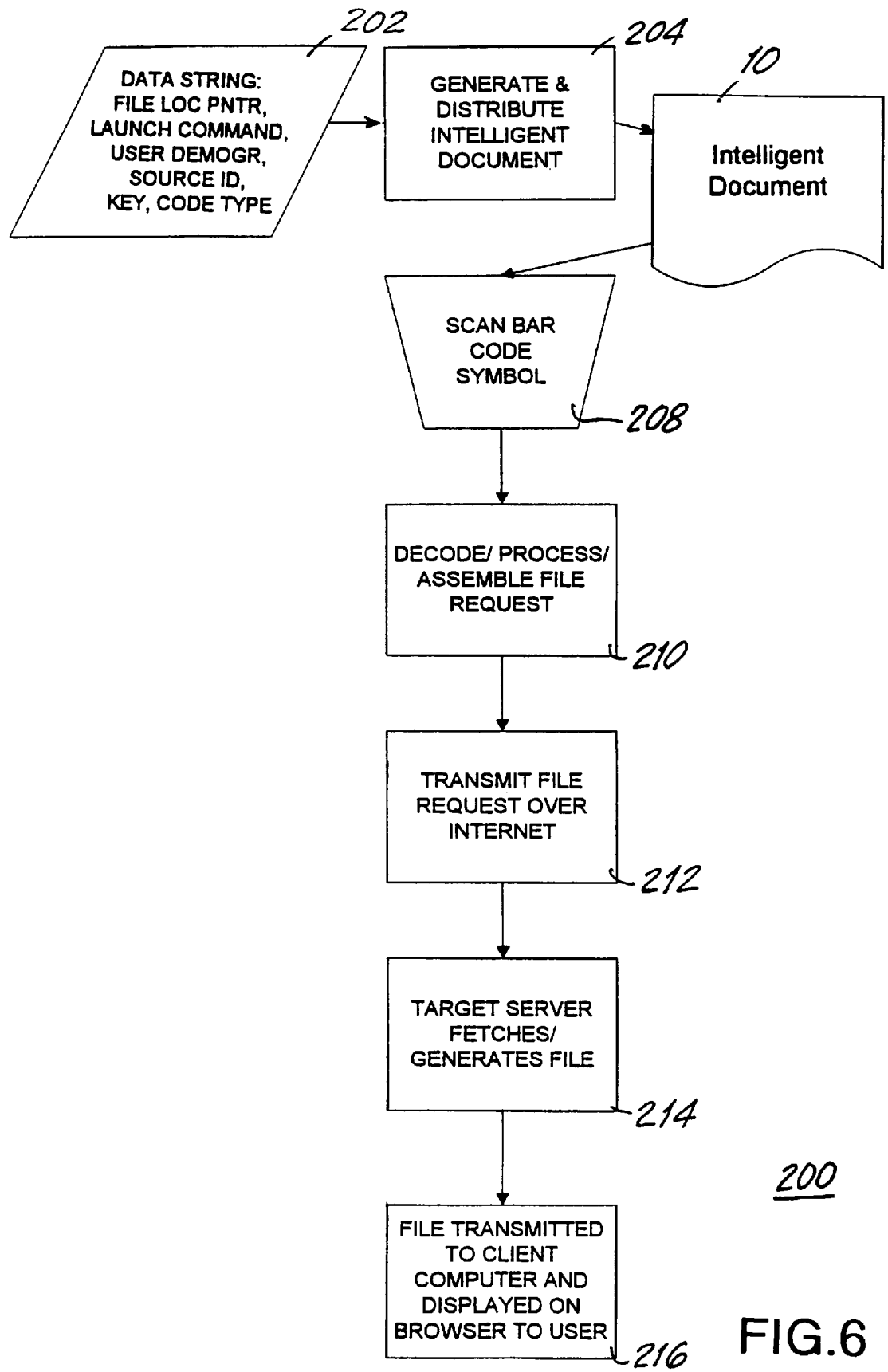
FIG. 6 is a top level flowchart of the method of the present invention.

The system operates with respect to FIGS. 1 and 6 as follows. A vendor who wishes to provide an intelligent document 10 programs certain parameters which will be encoded within a machine-readable code 12 and printed on the document along with text 16 or graphics 18. The document may be an advertisement in the form of a magazine insert or page, a brochure, a label for an envelope, a memorandum, and the like.

Parameters to be included within the machine-readable code depend upon the application desired by the vendor. For example, if the vendor wants the end-user to be able to load the vendor's world wide web (WWW) site automatically upon scanning the code 12, then the parameters included in the data string 20 that is assembled into the machine-readable code include a command 22 to launch an Internet browser application, such as NETSCAPE, and a file location pointer such as a uniform resource location (URL) code, such as www.xyzcorp.com (see FIG. 2). This information is encoded with encoding function 20 in accordance with the particular type of machine code being used. For example, one type of code which may be used by the present invention is a PDF417 symbol, which is described in detail in U.S. Pat. No. 5,304,786, which is incorporated by reference herein. The PDF417 symbol, known as a two-dimensional bar code symbol, has enough storage information to encode the browser launch command as well as the URL.

A printer 30 then utilizes the encoded data and desired text 16 and graphics 18 to print an intelligent document 10 a shown in the Figures.

The intelligent document 10 is disseminated to the end user in accordance with the methods desired by the vendor. For example, if the intelligent document is a magazine advertisement, then the user will obtain the magazine by conventional means such as purchase at a retail outlet, the mail, etc. Thus, as shown in FIG. 6, the data string at step 202 is used to generate and distribute at step 204 the intelligent document as desired.

The user, after reading the text and graphics in the document, can access the WWW site of the vendor by utilizing a scanner 34 in conjunction with his computer 32, programmed with appropriate software in accordance with the invention. That is, the user will optically scan the code 12 with an optical scanner 34. An optical scanner 34 sufficient to scan bar code symbols and the like is disclosed in U.S. Pat. No. 5,448,050, which is incorporated herein by reference. The device disclosed in the '050 patent is housed within a mouse type device, thus also including circuitry useful in point-and-click applications popular in personal computer platforms today.

After the two-dimensional bar code data is scanned by the scanner 34 (at step 208), a decoder 36 is used at step 210 to decode the raw data into usable commands and data. The decoder is typically a software program executed by the microprocessor of the computer, and provides thereby the browser launch command and URL which had been encoded by the vendor into the code. The WWW browser application 40 is then loaded, and the URL is used to access the WWW site of the vendor accordingly (at step 212). As a result, the user may automatically access the vendor's WWW site without having to enter the URL, thus eliminating all chances of error due to manual data input. After the file request is made at step 212, the internet server 48 at the target server computer 46 fetches or generates the target file 50, as shown in step 214. As shown in step 216, the file is transmitted to the client computer 32 and displayed on the browser 40 for viewing by the user.

The above scenario is useful when a vendor prints and distributes such intelligent documents on a mass scale. That is, the code distributed is the same for each user. In an alternative embodiment, specific user data is included with the data string 20 to provide for personalized operation as follows. This scenario is useful when the vendor makes individual printings keyed to individual users, such as when mailing labels are printed for inclusion on an envelope surrounding a magazine or the like.

In this case, the vendor may include in the code personal data such as the user's name, location, phone number, and other appropriate demographic information 23. When the user scans the document and loads the WWW site, the personal data is uploaded to the vendor's host computer 46 and stored in demographics log 52, thus providing the vendor with useful demographic data as to which users have actually utilized the intelligent document scanning service.

The code may also include security information useful in completing secure transfers across the Internet 44. For example, an encryption key 25 appropriate in a public or private key system may be embedded within the code. An appropriate software routine 38 in the user's computer utilizes the key after decoding it in order to encrypt certain data being sent across the Internet 44. For example, the encryption of credit card information is desired in order to thwart would-be intruders from misappropriating the information. The system of the present invention could be used to allow the user to order an item advertised in the brochure by taking the credit card number, already resident in the user's computer memory, and encrypting it with the key decoded from the code. When the user desires to purchase the item, he scans the associated code, and the credit card number is encoded and transmitted after the WWW site is accessed. The host computer can match the user's name (sent with the transmission) with the appropriate decryption key stored at the host, and decrypt the credit card number accordingly.

The system 10 of the present invention has additional embodiments which allow quick and easy retrieval of a data file on a local basis as well as the Internet 44. That is, the same principles may be applied within a company utilizing an intranet or local area network (LAN) 98. Thus, a department of a company may distribute fliers regarding certain events, new products, etc., and encode appropriate document access information in accordance with the teachings of the invention. The user may obtain further information by scanning the code on the document, which then causes his computer to access his network, file server, etc.

This embodiment is also useful in a small office environment, where a user prints out documents such as letters or memos that may need to be revised at a later date. It is common practice to manually type in the drive location of the document in the lower corner of the document to allow the user to easily access the document at a later date, without searching through massive amounts of files. Thus, a user may type in the text "c:\user\files\smith\clients\letters\xyzcorp\jonesltr\dec12" to indicate its location on his drive 94. When he desires to edit or otherwise access the document, he would, in the prior art, have to type in the entire location after launching the proper application (e.g. word processor). In accordance with the teachings of the present invention, a machine readable code may be encoded with this information (as well as a command to launch the application) and printed on the document. When the user later desires to edit the document, he scans the code. The code is decoded, the application is launched, and the file is fetched from the location specified in the code.

Figure 2:
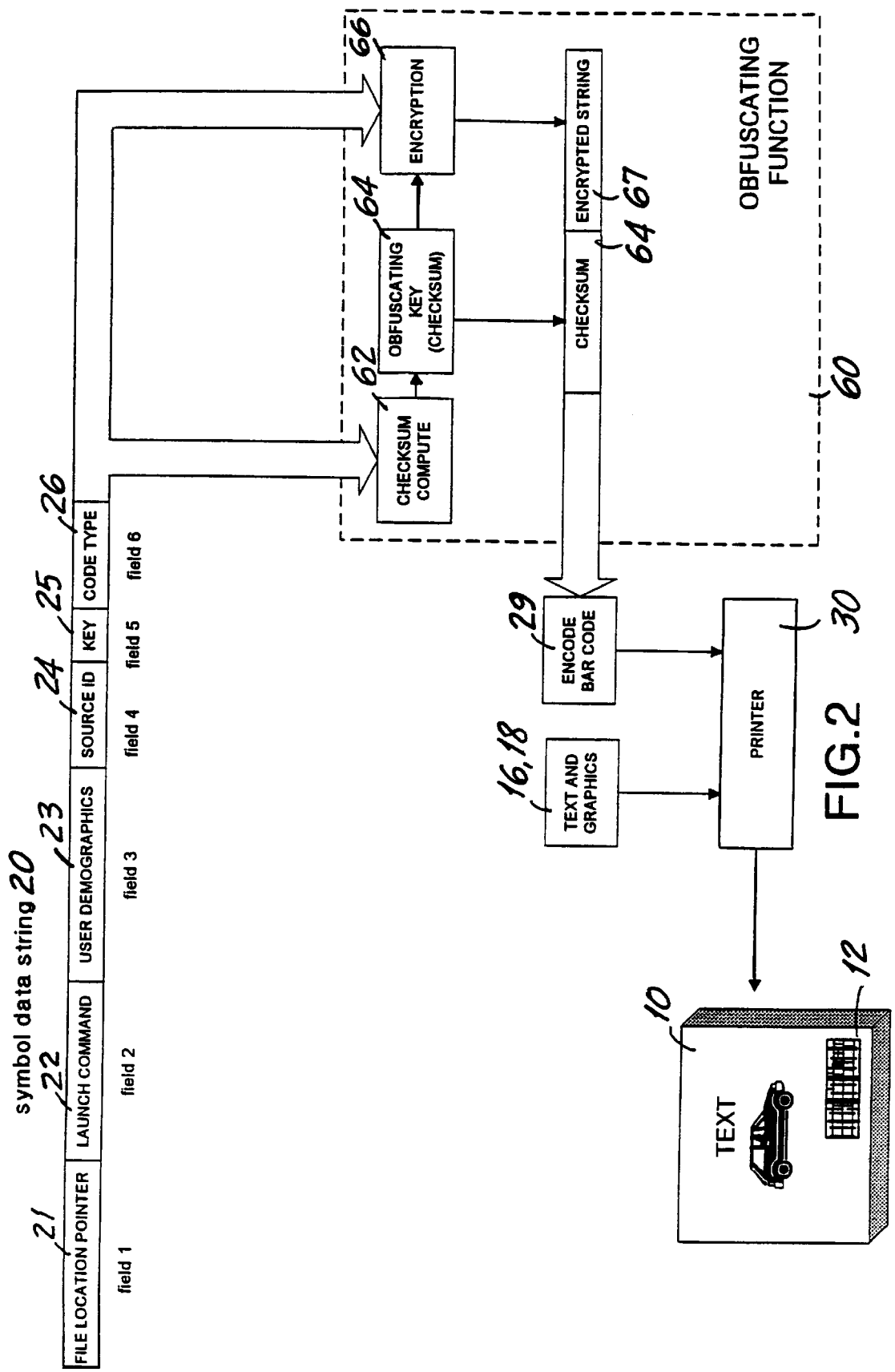
FIG. 2 is a diagram of the document generation function of FIG. 1.

The symbol data string 20 may be obfuscated by obfuscation function 28 prior to being encoded into the machine readable symbol. In this situation, the input string transposed by the client computer 32 must be de-obfuscated by de-obfuscating function 60. Referring to FIG. 2, the symbol data string is obfuscated by first computing a checksum of the symbol data string 20 by checksum computation function 62. The checksum is then utilized by the encryption logic 66 as an obfuscating encryption key 64. The symbol data string 20 is input to the encryption logic 66 as shown in FIG. 2, and provided thereby is an encrypted string 67. The encrypted string 67 is assembled with the checksum 64 (which has not been encrypted and is thus "in the clear"), and is input into an encoding function 29. The encoding function 29 then encodes the input checksum 64 and encrypted string 67 into a machine readable symbol, which is printed by the printer 30 onto the document 10. As mentioned above, optional text 16 and/or graphics 18 may also be printed onto the document 10 along with the machine readable code 12, if desired by the vendor.

Figure 7:
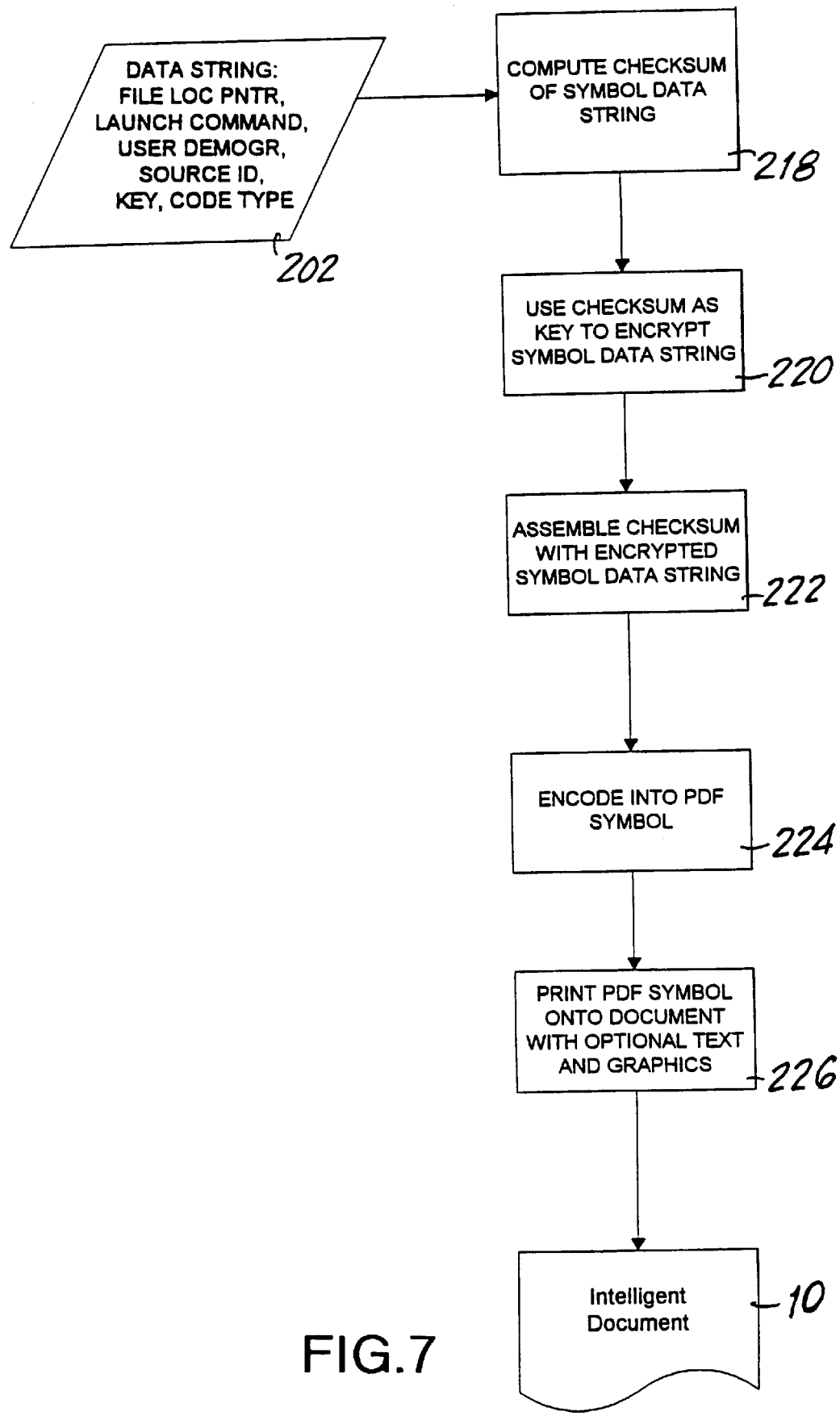
FIG. 7 is a flowchart of the document generation of the present invention.

FIG. 7 illustrates the logic flow implemented by the preferred embodiment of the present invention as thus described. That is, at step 202, the data string (which may comprise the file location pointer, a launch command, user demographics, a source identification, an encryption key, and/or a code type) is operated on to compute a checksum at step 218. At step 220, the checksum is used as a key to encrypt the symbol data string. At step 222, the checksum and encrypted key are assembled together; at step 224 this assembled word is encoded into a machine readable symbol (such as a PDF417 two dimensional bar code symbol). The symbol is then printed onto the intelligent document 10 with optional text or graphics at step 226.

Figure 3:
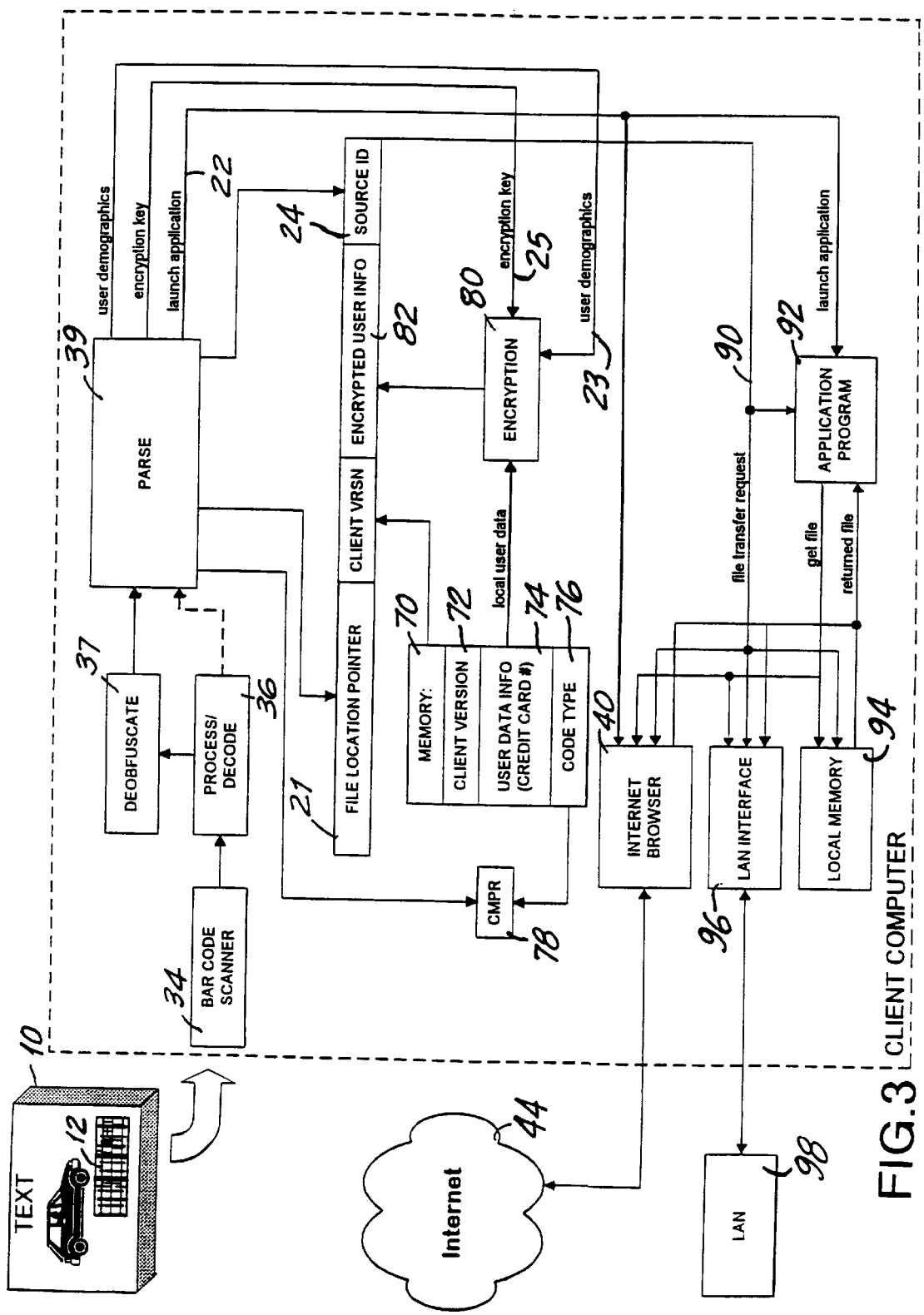
FIG. 3 is a diagram of the client computer functions of FIG. 1.

FIG. 3 illustrates in detail the processing of the client computer 32. The machine readable symbol 12 is scanned by the bar code scanner 34, and the scanned data is processed and decoded by block 36 as well known in the art. The decoded data is input to the de-obfuscation process 37 (described in detail below), or, if obfuscation has not been implemented in the system, to parsing block 39 as shown by the dotted line.

Figure 4:
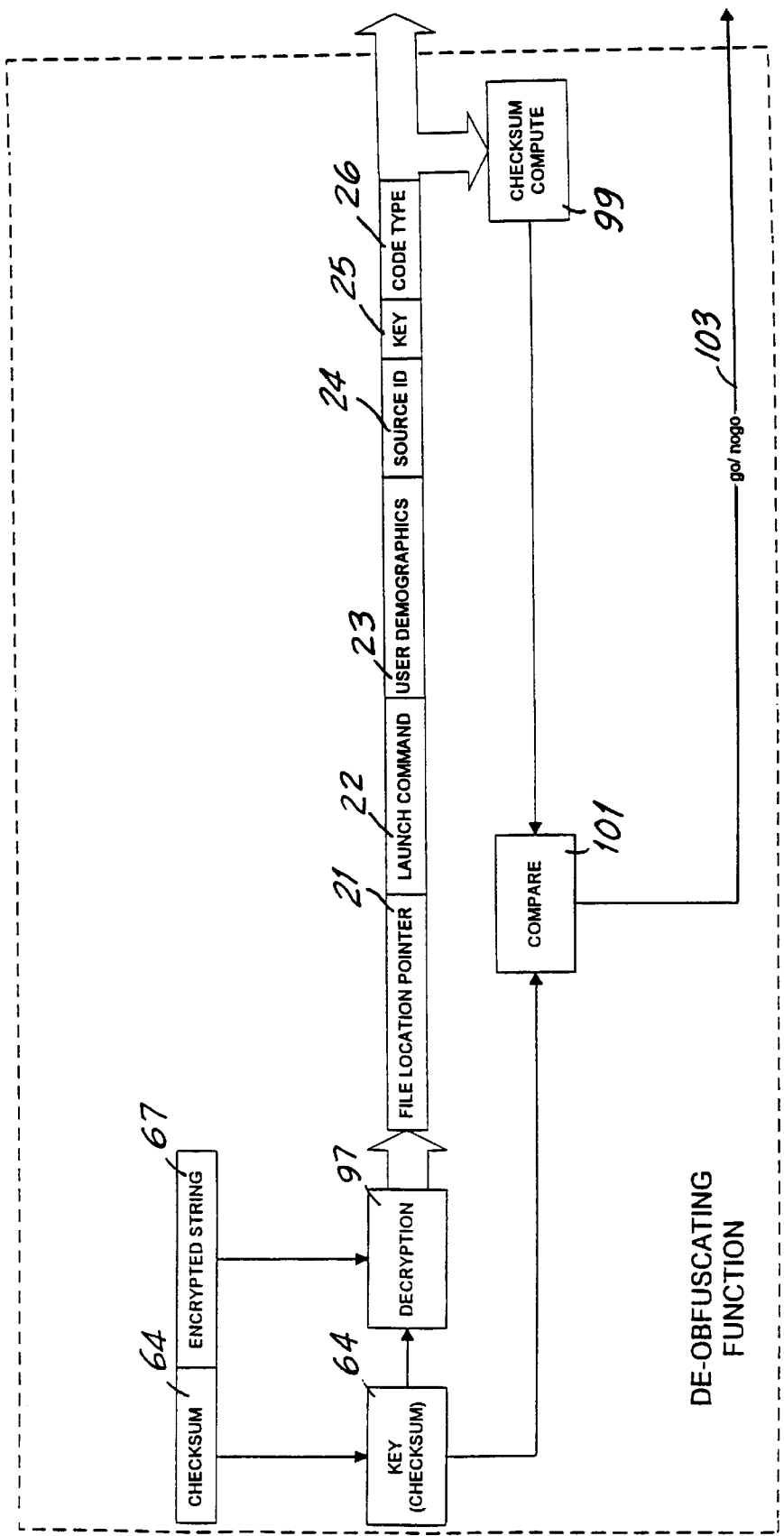
FIG. 4 is a diagram of the deobfuscating function carried out by the client computer of FIG. 3.

De-obfuscation is the reverse process of obfuscation, and is shown in detail in FIG. 4. The decoded input string from decoder 36 is parsed into two constituent components; the checksum 64, and the encrypted string 67. The checksum 64 is utilized as a decryption key along with decryption logic 97 (which is the parallel process of encryption logic 66) to produce a decrypted data string that is comprised of a file location pointer 21, launch command 22, user demographics 23, source identification 24, encryption key 25, and code type 26. A checksum of this decrypted data string is then computed by checksum compute block 99, and compared by compare block 101 to the checksum 64 that was received in the clear. When the comparison is successful, then a valid condition is indicated on the go/nogo line 103. Conversely, when the comparison is not successful (the computed checksum is not equal to the received checksum), then an invalid condition is indicated on the go/nogo line 103.

Figure 8:
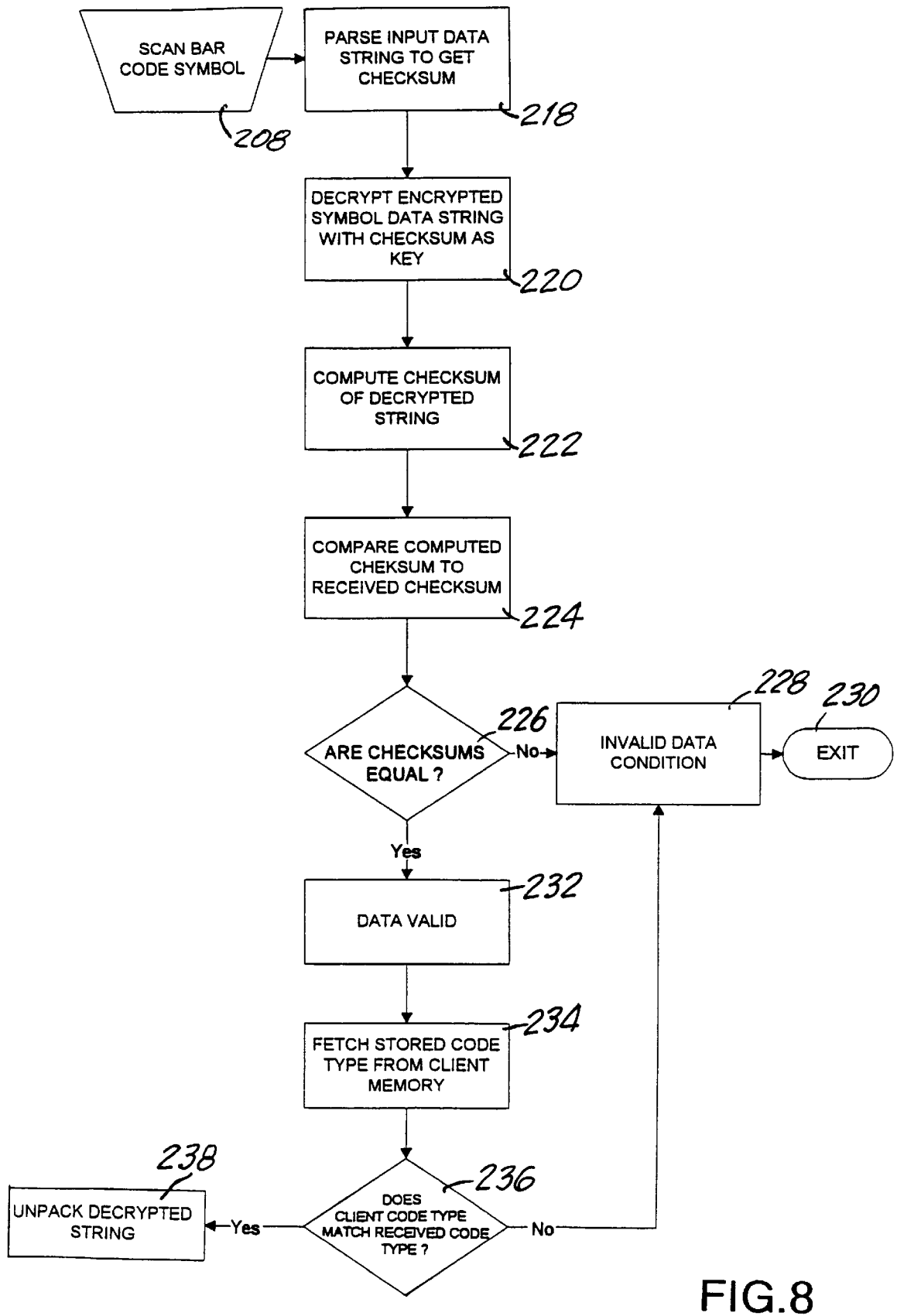
FIGS. 8 and 9 are a flowchart of the scanning and processing by the client computer of the present invention.

The logic flow of the de-obfuscating function is illustrated in FIG. 8. At step 208, the bar code symbol is scanned by the user. At step 218, the decoded input data string is parsed to obtain the checksum, which is utilized at step 220 as a key to decrypt the remaining portion of the string (the encrypted data string). At step 222, the checksum of the decrypted string is computed, and at step 224, it is compared to the received checksum. Decision block 226 directs the flow to step 228 when an invalid data condition is detected (i.e. the checksum comparison is unsuccessful), and the routine exits at step 230. Decision block 226 likewise directs the flow to step 232 when a valid data condition is detected (i.e. the checksum comparison is successful). When successful, a code type 76 (see FIG. 3) is fetched from memory 70 at step 234, and then compared via comparator function 78 at step 236 to the code type that was in the received (decrypted) data string. When no match is found, an invalid data condition is indicated at step 228, and the routine exits at step 230. When a code type match is found, then the decrypted string is unpacked at step 238 for further processing.

With reference to FIG. 3, once the de-obfuscation process 37 is determined to be successful and the code match is valid, then the file location pointer 21 and source identification data 24 is loaded to a file transfer request word for subsequent loading to the Internet browser 40, LAN interface 96, or local memory 94, depending on the location of the file to be fetched. The file transfer request word may also be loaded with client version data 72, which indicates to the server which version of the client software is requesting the file.

The source identifier data string 24 that is parsed from the decoded (and de-obfuscated) scanned data string may comprise data correlated to the user (or expected user) of the intelligent document 10. As described below with reference to FIG. 5, the source identifier (source id) string will be used to access a lookup table to determine a decryption key associated with the file access, so that the target server may decrypt certain (encrypted) user information received from the client computer as part of the file transfer request word.

Local user data 74, such as the user's credit card number, is stored in memory 70 and accessed by the client computer for inclusion in the file transfer request word 90 after being encrypted by encryption block 80. That is, when it is desired to transit sensitive user data such as the user's credit card number to the target server computer 46 over the Internet 44, then the encryption block 80 will encrypt the user data by using the encryption key 25 that was obtained from the received data string. In addition, certain user demographics data 23 may be included in the data string 20 (see FIG. 2), which may be correlated to a user (or expected user) of the document 10. This user demographics data could then also be encrypted with encryption block 80 utilizing encryption key 25 to produce encrypted user information 82, for inclusion in the file transfer request word 90.

Optionally, if a launch command 22 was included in the data string 20, then it could be used to execute or launch the designated application. For example, the launch command 22 could cause a word processing program to open and fetch the target file from local memory 94. Likewise, the launch command 22 could execute an Internet browser program 40, so that the file transfer request word 90 would cause the browser to request the appropriate file over the Internet 44.

Figure 9:
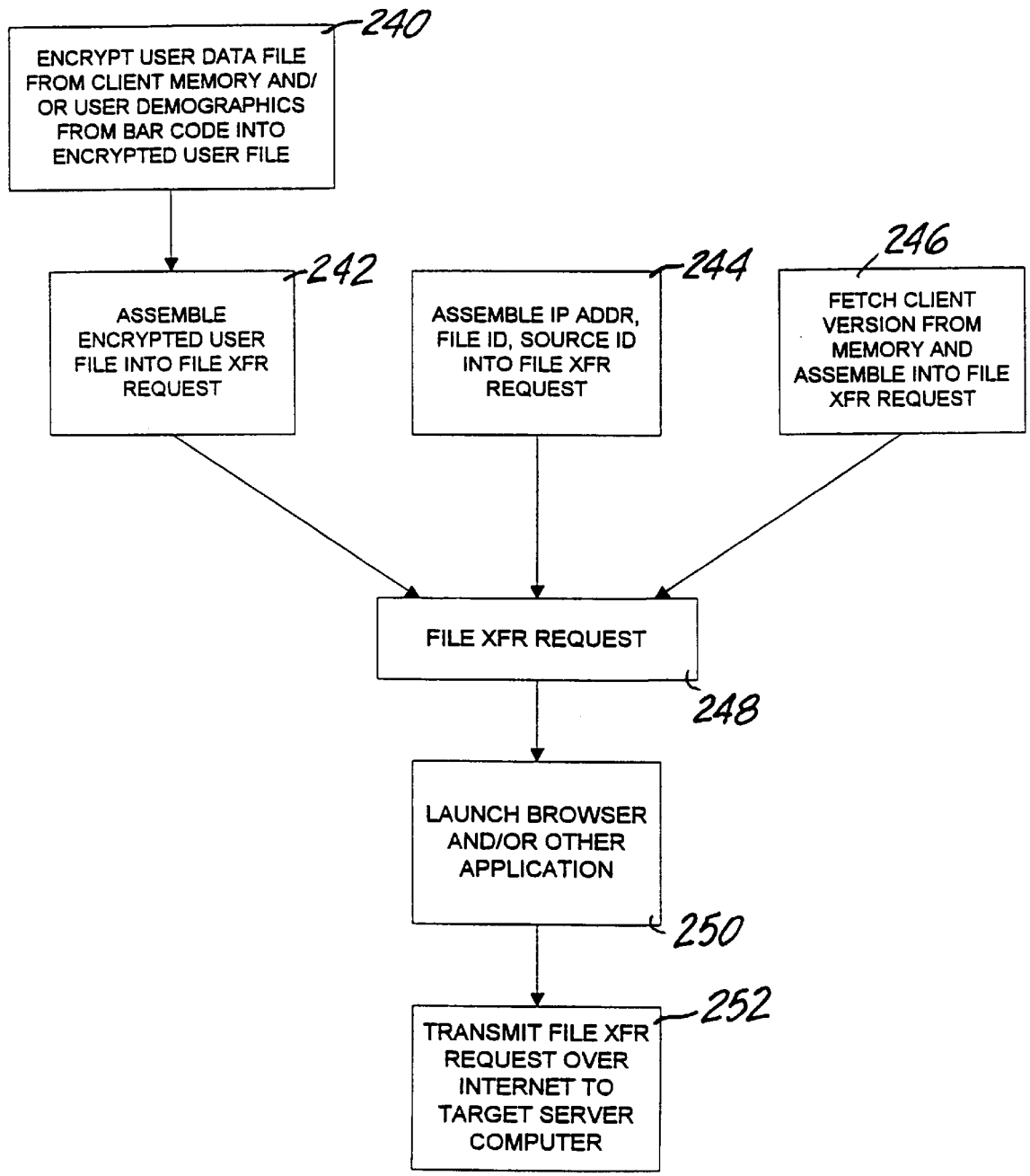

The logical flow of this process is shown in FIG. 9. At step 240, the user data is taken from memory 70 and encrypted, optionally along with user demographics data obtained from the scanned and de-obfuscated bar code symbol to produce encrypted user information 82. At step 248, the file transfer request 90 is assembled from the encrypted user information (step 242), the file location pointer (optionally comprising the IP address and file identifier) 21 and the source identifier data 24 that are obtained from the scanned and de-obfuscated bar code symbol (step 244), and the client version 72 fetched from memory 70 (step 246). The browser and/or other client application is launched at step 250, and at step 252 the file transfer request is transmitted over the Internet (or LAN) to the target server computer.

Figure 5:
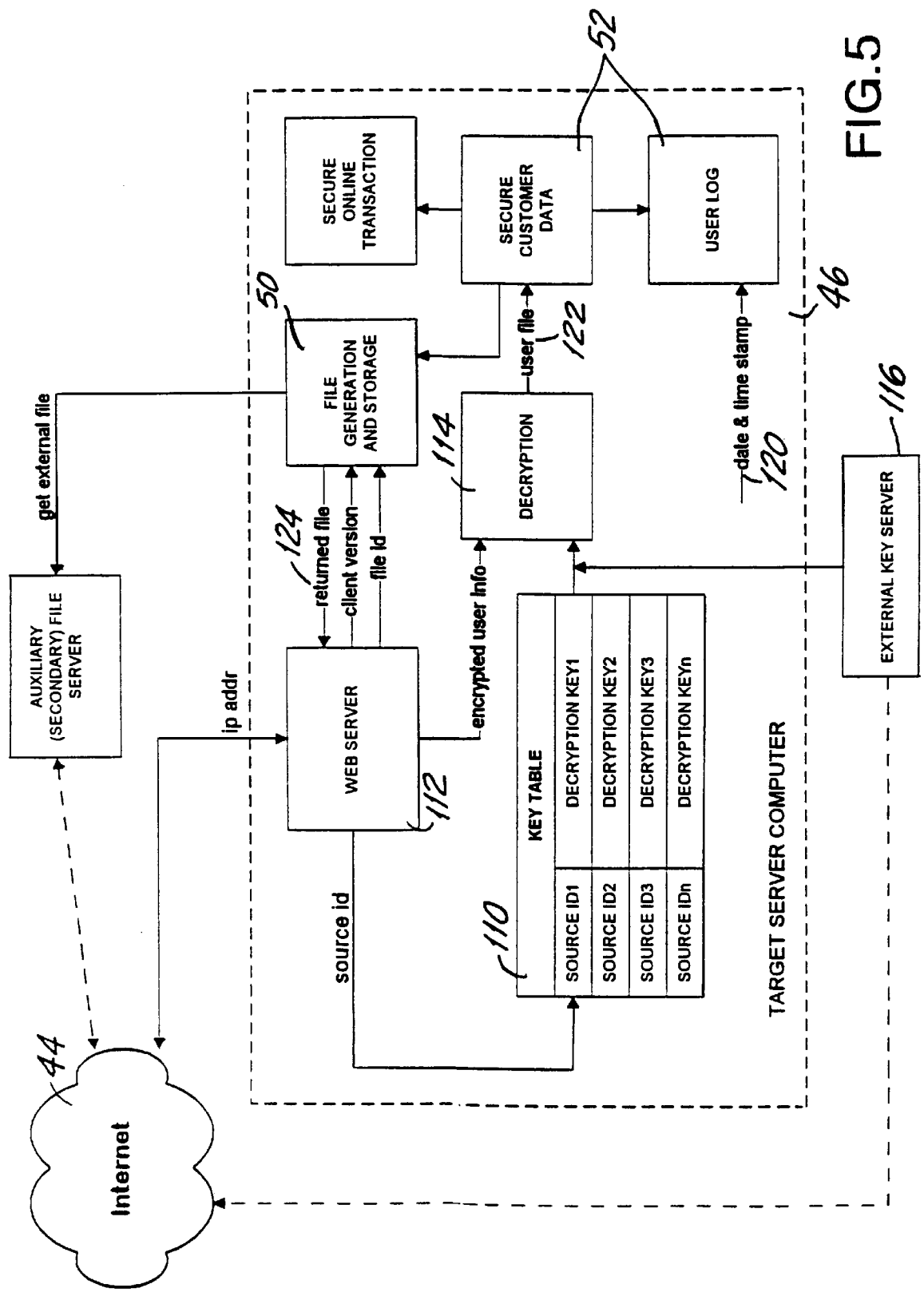
FIG. 5 is a diagram of the target server computer of FIG. 1.
Figure 10:
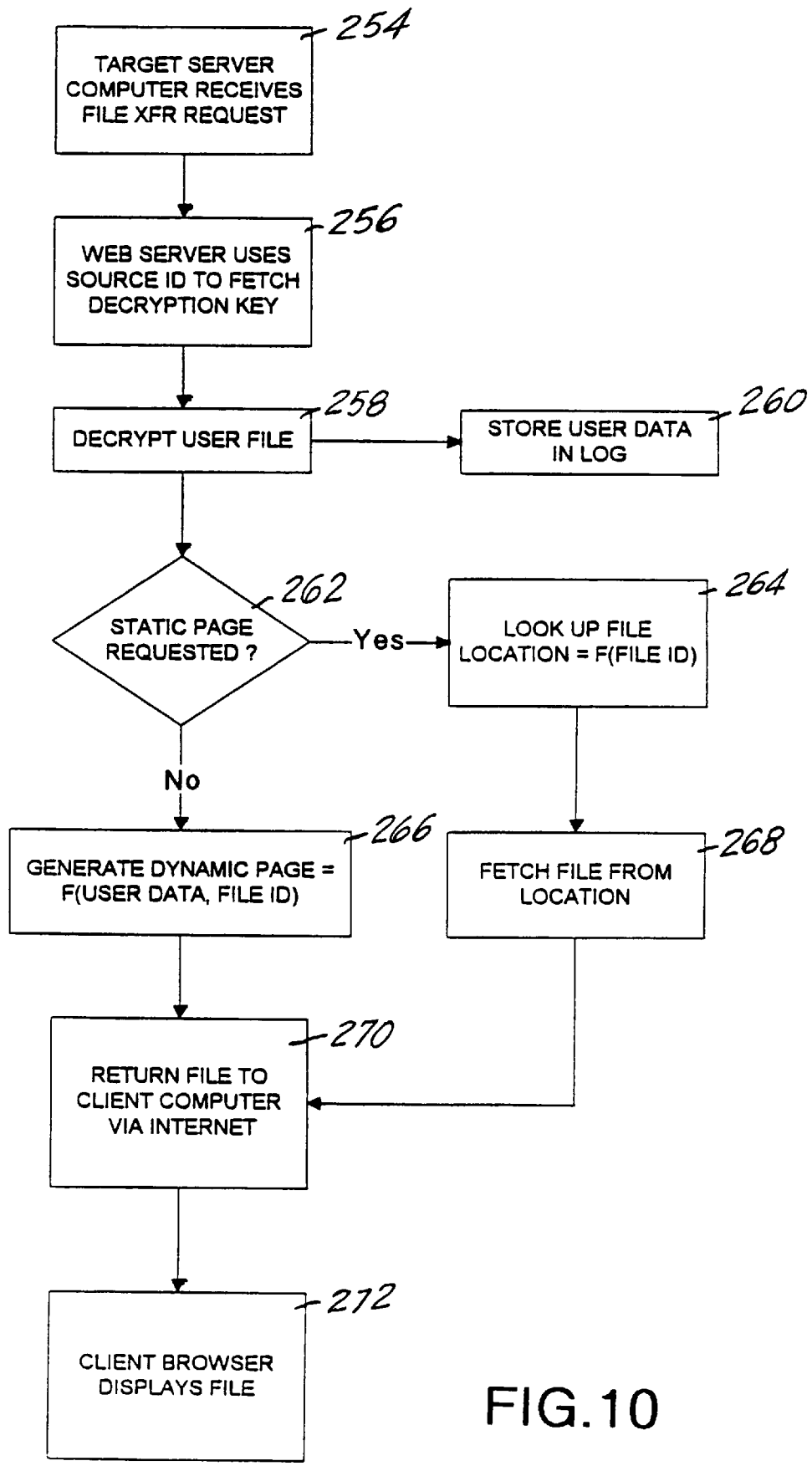
FIG. 10 is a flowchart of method used by the target server computer of the present invention.

With reference to FIGS. 5 and 10, the operation of the target server computer 46 upon receiving the file transfer request will now be described. At step 254, the target server computer 46 receives the file transfer request, for example from the Internet 44. In the Internet example, the target server computer 46 is located at "IP ADDR" (internet protocol address), via means well known in the art. A web server process 112 is executing on the target server computer 46, which at step 256 uses the source identifier string from the file transfer request to fetch a decryption key from key table 110. That is, for each particular source ID, there exists a decryption key mapped thereto that is complementary to the encryption key 80 utilized by the client computer to encrypt sensitive user information prior to assembly into the file transfer request. The decryption key is then used at step 258 to decrypt the encrypted user information with decryption process 114 to obtain user file 122. Optionally, an external key server 116, which may be interconnected to the Internet, is used to obtain the decryption key. The decrypted user file is then stored in the secure customer data memory 52, and the user request is tracked in the user log along with the date and time 120 of the request.

As shown in step 262, if a pre-existing file (i.e a static web page) was requested, then the file is obtained from storage 50, wherein the location is a function of the file identifier (ID) taken from the file location pointer. In this event, the file is fetched from the appropriate location at step 268 and returned to the client computer via the Internet at step 270. The file is then displayed on the client browser at step 272.

If, however, a static page was not requested, but a dynamic page must be generated, then the dynamic page is generated at step 266, for example as a function of the user data and file ID. This could occur where the file to be returned is customized to a user in accordance with is or her identifying indicia. The generated page is then returned to the client browser via the Internet as described above.

Alternatively, the requested file may be located on an external file server, which may be accessed by file generation and storage means 50 for return thereto or for direct forwarding to the client computer via the Internet, as shown by the dotted line in FIG. 5.

What is claimed is:

1. A method for a client computer to retrieve a computer file comprising the steps of:
   a) encoding a symbol data string comprising a file location pointer into a machine readable symbol;
   b) rendering said machine readable symbol within a data carrier;
   c) transposing an input data string from said machine readable symbol with a computer input device coupled to said client computer;
   d) parsing said input data string to determine said file location pointer; and
   e) utilizing said file location pointer to request the computer file designated thereby, by
      assembling a computer file transfer request word comprising said file location pointer, and
      transmitting said computer file transfer request word to a target server computer via a computer network system;
   f) said target server computer receiving said computer file transfer request word and
   g) said target server computer transmitting a computer file to said client computer in response thereto;
      wherein said machine readable symbol also has encoded therein a source identifier data string, said source identifier data string comprising data correlated to an expected user of said data carrier, and wherein said source identifier data string is transposed by said computer input device.

2. The method of claim 1 wherein said computer network system is an Internet, and wherein said computer file transfer request word is directed towards a target server computer in communication with the Internet.

3. The method of claim 2 wherein said file location pointer comprises a uniform resource locator (URL) for specifying a file on the target server computer in communication with the Internet.

4. The method of claim 1 wherein said file location pointer comprises a network address associated with said target server computer and a file identifier correlated to the computer file requested by said client computer.

5. The method of claim 1 wherein said source transposed source identifier data string is assembled within said computer file transfer request word and transmitted to said target server computer.

6. The method of claim 5 wherein said target server computer stores said source identifier data string received from said client computer in said computer file transfer request word.

7. The method of claim 5 wherein
   said machine readable symbol also has encoded therein an encryption key associated with said source identifier data string,
   said encryption key is transposed by said computer input device,
   said transposed encryption key is used by said client computer to encrypt information specific to a user associated with said client computer, and
   said encrypted user information is assembled within said computer file transfer request word and transmitted to said target server computer.

8. The method of claim 7 wherein said information specific to a user is obtained, prior to encryption thereof, from a user information data file stored on said client computer.

9. The method of claim 7 wherein
   said machine readable symbol also has encoded therein user demographics data,
   said user demographics data correlated to a targeted user of said data carrier,
   said user demographics data is transposed by said computer input device, and wherein
   said information specific to a user is obtained, prior to encryption thereof, from said transposed user demographics data.

10. The method of claim 7 wherein
    said target server computer utilizes said source identifier data string to access a lookup table to determine a decryption key associated with said encryption key, and
    said target server decrypts said encrypted user information received from said client computer.

11. The method of claim 10 wherein said lookup table is stored locally on said target server computer.

12. The method of claim 10 wherein said lookup table is stored remotely on a secondary server computer.

13. The method of claim 10 wherein said user information comprises a credit card number associated with said user of said client computer, and wherein on online electronic commercial transaction is accomplished by utilizing said credit card number.

14. A method for a client computer to retrieve a computer file comprising the steps of:
    a) encoding a symbol data string comprising a file location pointer into a machine readable symbol;
    b) rendering said machine readable symbol within a data carrier;
    c) transposing an input data string from said machine readable symbol with a computer input device coupled to said client computer;
    d) parsing said input data string to determine said file location pointer; and
    e) utilizing said file location pointer to request the computer file designated thereby, by assembling a computer file transfer request word comprising said file location pointer, and transmitting said computer file transfer request word to a target server computer via a computer network system;

f) said target server computer receiving said computer file transfer request word and g) said target server computer transmitting a computer file to said client computer in response thereto;

wherein said machine readable symbol also has encoded therein user demographics data, said user demographics data correlated to a targeted user of said data carrier, and wherein said user demographics data is transposed by said computer input device.

15. The method of claim 14 wherein said user demographics data is included in said file transfer request word transmitted to said target computer, and wherein said user demographics data is stored in said target server computer.

16. The method of claim 15 wherein said computer file transmitted by said target server computer to said client computer is at least partially determined by at least part of said user demographics data.

17. A computer system comprising:

a) a client computer interconnected to a computer network comprising a target server computer associated therewith, and b) a computer input device coupled to said client computer, adapted to read a machine readable symbol from a data carrier and transmit to said client computer an input data string;

wherein said client computer comprises processing means for transposing said input data string to a plurality of constituent fields, said fields comprising at least a file location pointer;

means for utilizing said file location pointer to request the computer file designated thereby; comprising means for passing said file location pointer to an application program on said client computer suitable for processing the corresponding computer file;

means for the application program to retrieve the computer file from the specified file location;

means for assembling a computer file transfer request word comprising said file location pointer, and means for transmitting said computer file transfer request word to said target server computer via said network;

wherein said target server computer comprises:

means for receiving said computer file transfer request word; and means for transmitting a computer file to said client computer in response to said computer file transfer request word;

wherein said input data string fields also comprise a source identifier data string, said source identifier data string comprising data correlated to an expected user of said data carrier.

18. The computer system of claim 17 wherein said computer network is an Internet, and wherein said computer file transfer request word is directed towards a target server computer in communication with the Internet.

19. The computer system of claim 18 wherein said file location pointer comprises a uniform resource locator (URL) for specifying a file on the target server computer in communication with the Internet.

20. The system of claim 17 wherein said assembling means also assembles said source identifier data string within said computer file transfer request word.

21. The computer system of claim 20 wherein said target server computer further comprises means for storing said source identifier data string received from said client computer in said computer file transfer request word.

22. The computer system of claim 20 wherein said input data string fields also comprise an encryption key associated with said source identifier data string, and wherein said client computer further comprises means for encrypting with said encryption key a user information data file stored on said client computer, said user information data file comprising information regarding the user associated with said client computer, and wherein said encrypted user information data file is assembled within said computer file transfer request word and transmitted to said target server computer.

23. The computer system of claim 22 wherein said client computer comprises memory means for storing a user information data file, and wherein said information specific to a user is obtained, prior to encryption thereof, from said user information data file.

24. The computer system of claim 22 wherein said input data string fields also comprise user demographics data correlated to a targeted user of said data carrier, and wherein said information specific to a user is obtained, prior to encryption thereof, from said user demographics data.

25. The computer system of claim 22 wherein said target server computer comprises means for accessing a lookup table, said lookup table for storing a decryption key associated with said source identifier data string, to obtain said decryption key associated with said source identifier data string, and means for decrypting, utilizing said decryption key, said encrypted user information received from said client computer.

26. The computer system of claim 25 wherein said lookup table is stored locally on said target server computer.

27. The computer system of claim 25 wherein said lookup table is stored remotely on a secondary server computer.

28. The computer system of claim 25 wherein said user information comprises a credit card number associated with said user of said client computer, and wherein said client computer further comprises means for executing on online electronic commercial transaction by utilizing said credit card number.

29. A computer system comprising:

a) a client computer interconnected to a computer network comprising a target server computer associated therewith, and b) a computer input device coupled to said client computer, adapted to read a machine readable symbol from a data carrier and transmit to said client computer an input data string;

wherein said client computer comprises processing means for transposing said input data string to a plurality of constituent fields, said fields comprising at least a file location pointer;

means for utilizing said file location pointer to request the computer file designated thereby; comprising means for passing said file location pointer to an application program on said client computer suitable for Processing the corresponding computer file;

means for the application program to retrieve the computer file from the specified file location;

means for assembling a computer file transfer request word comprising said file location pointer, and means for transmitting said computer file transfer request word to said target server computer via said network;

wherein said target server computer comprises:

means for receiving said computer file transfer request word; and means for transmitting a computer file to said client computer in response to said computer file transfer request word;

wherein said input data string fields also comprise user demographics data correlated to a targeted user of said data carrier.

30. The computer system of claim 29 wherein said user demographics data is included in said file transfer request word transmitted to said target computer, and wherein said target server computer comprises means for storing said user demographics data.

31. The computer system of claim 30 wherein said target server computer comprises means for utilizing said user demographics data to at least partially determine the computer file transmitted by said target server computer to said client computer.

* * * * *